United States Patent
Seni et al.

(10) Patent No.: US 6,453,070 B1
(45) Date of Patent: Sep. 17, 2002

(54) DIACRITICAL PROCESSING FOR UNCONSTRAINED, ON-LINE HANDWRITING RECOGNITION USING A FORWARD SEARCH

(75) Inventors: Giovanni Seni, Mountain View; John Seybold, Palo Alto, both of CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/042,829

(22) Filed: Mar. 17, 1998

(51) Int. Cl.$^7$ ................................................ G06K 9/00
(52) U.S. Cl. ...................... 382/187; 382/119; 382/186; 382/229
(58) Field of Search ................................ 382/186, 187, 382/230, 231, 119, 123, 229

(56) References Cited

U.S. PATENT DOCUMENTS

| | | | | |
|---|---|---|---|---|
| 3,710,321 A | * | 1/1973 | Rubenstein | 340/146.3 |
| 4,611,346 A | * | 9/1986 | Bednar et al. | 382/9 |
| 5,373,566 A | * | 12/1994 | Murdock | 382/15 |
| 5,454,046 A | * | 9/1995 | Carman | 382/186 |
| 5,463,696 A | | 10/1995 | Beernink et al. | 382/186 |
| 5,559,897 A | | 9/1996 | Brown et al. | 382/186 |
| 5,590,257 A | * | 12/1996 | Forcier | 395/792 |
| 5,717,939 A | * | 2/1998 | Bricklin et al. | 395/189 |
| 5,768,423 A | * | 6/1998 | Aref et al. | 382/228 |
| 5,812,697 A | * | 9/1998 | Sakai et al. | 382/186 |
| 5,812,698 A | * | 9/1998 | Platt et al. | 382/186 |
| 5,903,668 A | * | 5/1999 | Beernink | 382/187 |
| 5,999,703 A | * | 12/1999 | Schwartz | 382/163 |
| 6,018,591 A | * | 1/2000 | Hull et al. | 382/186 |

OTHER PUBLICATIONS

Giovanni Seni and Edward Cohen, External Word Segmentation of Off–Line Handwritten Text Lines, Aug. 6, 1993, pp. 41–52.

C.C. Tappert, A Divide and Conquer Cursive Script Recognizer, Oct. 7, 1988, pp. 1–8.

Giovanni Seni, Rohini K. Srihari and Nasser Nasrabadi, Large Vocabulary Recognition of On–Line Handwriten Cursive Words, Jul, 1996, pp. 757–762.

J.J. Odell, V. Valtchev, P.C. Woodland, S.J. Young, A One Pass Decoder Design For Large Vocabulary Recognition, Proc. Human Language Technology Workshop, Plainsboro, NJ, Mar. 1994, pp. 405–410.

Wacef Guerfali and Rejean Plamondon, Normalizing and Restoring On–Line Handwriting, pp. 419–431.

* cited by examiner

Primary Examiner—Thomas D. Lee
(74) Attorney, Agent, or Firm—Hisashi D. Watanabe

(57) ABSTRACT

Handwritten ink is scanned to identify potential diacriticals. A list of diacriticals (19) is generated by traversing the ink. Potential diacritical-containing characters are processed by scoring them with and without a diacritical to generate a first and second score. The first score is compared to the second score to in order to make a decision as to which variant of the potential diacritical-containing character produced a highest score. The highest score is used as a score for a theory and the decision is recorded. A data structure (50) is added to the theory. Each data unit in the data structure (50) corresponds to an entry in the list of diacriticals (19). As a new theory is created by propagation, contents of the data structure (50) are copied into the new theory. Thus, the data structure (50) is used to ensure that all handwritten ink is used and is used only once.

14 Claims, 4 Drawing Sheets

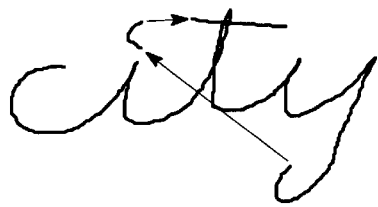
FIG. 1
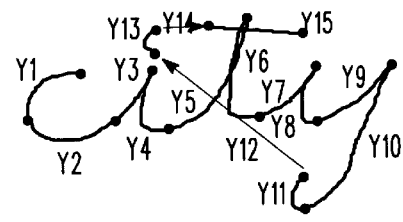
FIG. 2
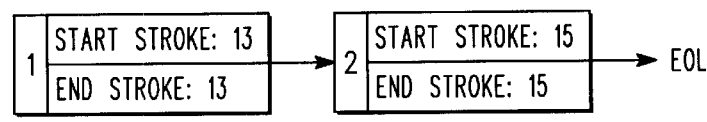
FIG. 4
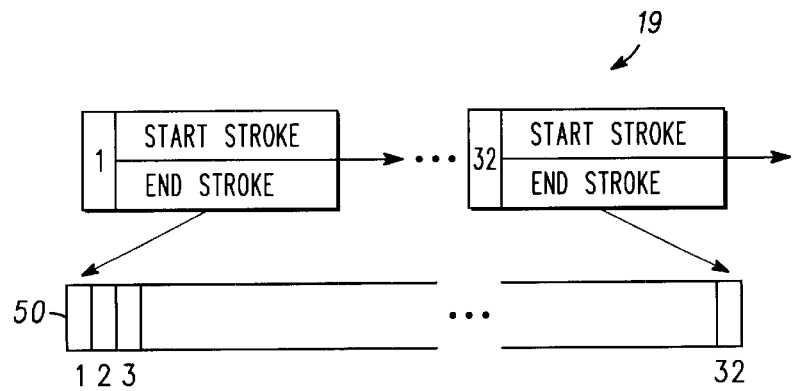
FIG. 5
FIG. 6
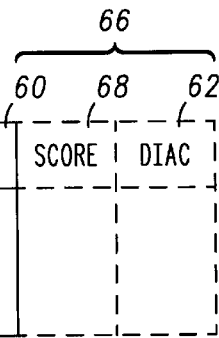

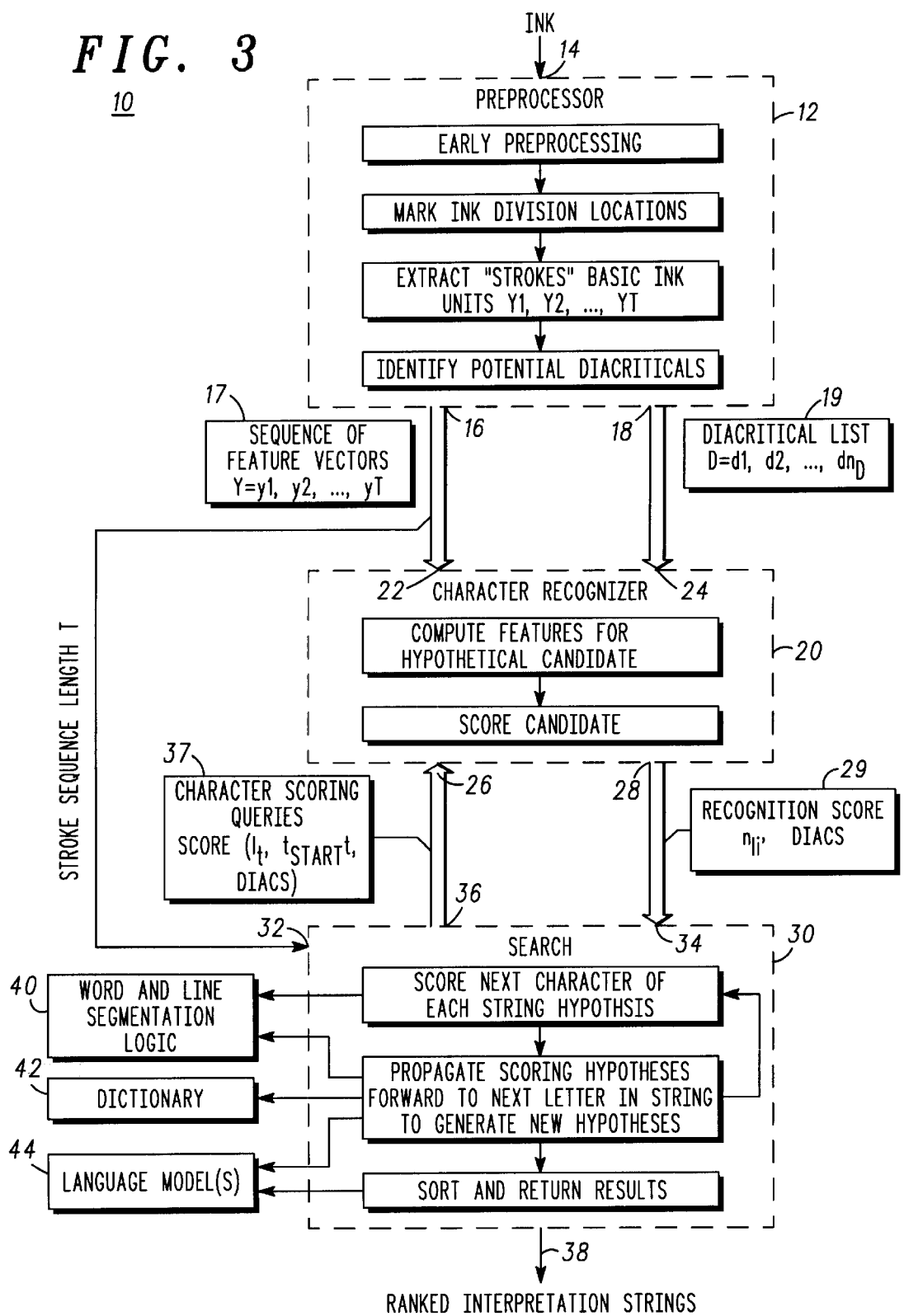

DIACRITICAL PROCESSING FOR UNCONSTRAINED, ON-LINE HANDWRITING RECOGNITION USING A FORWARD SEARCH

FIELD OF THE INVENTION

The present invention relates to diacritical processing for unconstrained, on-line handwriting recognition using a forward search.

BACKGROUND OF THE INVENTION

Handwriting is a process with an inherent temporal structure; it consists of a pen being driven along a trajectory in time. Such temporal information, however, gets lost when an input script is scanned from a page (i.e., "off-line" recognition), but temporal information is available when the input script is captured using a digitizing tablet (i.e., "on-line" recognition). Recognition in the off-line case is difficult because it is necessary to deal with overlapping or touching characters, unintentional pen lifts and different stroke widths. Such events sometimes significantly alter the topological pattern of characters in the input script. These events, however, have little or no influence on the dynamic pattern of motion in the writing. As a result, on-line recognition systems commonly use time-based representation schemes.

Time-based representations, however, are subject to a source of misinformation as well. For instance, the letter "E" can be written using multiple pen trajectories generating temporal variations that are not apparent in its static representation. While such variations in trajectory can be relatively large in isolated characters, it is believed that the number of variations is limited when writing naturally run-on text.

Another difficulty with time-based representations is that of delayed diacriticals. A delayed diacritical is a piece of ink used to complete a character but which does not immediately follow the last portion of that character. For example, FIG. 1 illustrates an example image for the word "city" written in cursive style with diacriticals in the order in which the body, the i-dot and the t-cross of the word were written. As shown, the word "city" is usually written with three ink portions—the first ink portion is the main body of the word, the second ink portion is the dot for the "i" and the third ink portion is the cross of the "t". Delayed diacriticals constitute a problem for time ordered representations because all the evidence for a character may not be contiguous.

Delayed diacriticals introduce significant complexity to the design of an on-line handwriting recognizer, because processing the delayed diacriticals requires some reordering of the time domain information. As shown above in FIG. 1, it is common in cursive writing to write the body of a "t", "j" or "i" (and sometimes an "x" or "f") during the writing of the word, and then to return and dot or cross the letter once the word is complete. Apostrophes may also be written at the end of the word in a similar way. A difficulty arises because the recognizer has to look ahead when scoring one of these characters to find the mark occurring later in the input script that completes the character.

Scanning the input script some distance into the future to identify potential diacriticals, remove the potential diacriticals in a preprocessing step, and associate the identified potential diacritical with corresponding characters earlier in the word is a previously proposed procedure to address the problem of processing delayed diacriticals. The identification and removal of potential diacriticals can be done as a preliminary operation (as described in L. Schomaker, "Using stroke- or character-based self organizing maps in the recognition of on-line, connected cursive script", Pattern Recognition, 26(3): 443–450, 1993), but this approach is error-prone because marks that are not diacriticals may be incorrectly identified and removed, and true diacriticals may be overlooked and/or skipped. A further problem with this approach is that the procedure may end up discarding ink which is valuable for character disambiguation (e.g., between a cursive style "i" and a cursive style "e" or between a cursive style "t" and a cursive style "l").

Trying to-reinsert the diacriticals at a better position (as described in C. C. Tappert, "A Divide-And-Conquer Cursive Script Recognizer", Research Report, IBM Watson Research Center, 1988; and P. Morasso, L. Barberis, S. Pagliano, and D. Vergano, "Recognition experiments of cursive dynamic handwriting with self-organizing networks", Pattern Recognition, 26(3):451–460, 1993) is a further previously proposed procedure to address the problem of processing delayed diacriticals. One difficulty with this approach is that very often it is not obvious at what point of the word the diacritical should be linked; particularly, because these diacriticals are usually carelessly positioned. The closest point in the word may not correspond to the intended location of the diacritical.

Time-based representation schemes view an unknown input ink as a sequence of feature vectors, $Y=y1, y_2, \ldots y_T$. Each of these vectors typically represents geometrical properties of a short contiguous ink fragment (i.e., strokes) as shown in FIG. 2. Pairing each of these vectors, $y_t$, with an indication of whether or not those sections of the ink were later horizontally covered by a diacritical mark (as described in M. Schenkel, I. Guyon and D. Henderson, "On-line cursive script recognition using time-delay neural networks and hidden markov models", IEEE Conf. on Acoustics, Speech and Signal Processing, Australia, 1994; and G. Seni, "Large Vocabulary Recognition of On-Line Handwritten Cursive Words", IEEE Transactions on Pattern Analysis and Machine Intelligence, 18(6), June, 1996) is still a further previously proposed procedure to address the problem of delayed diacriticals. The problem with this approach is that it does not allow for a strict accounting of the ink—that is, this approach does not ensure that every piece of ink in the input is used exactly once.

Thus, a need exists for a method and apparatus to allow trying a number of different treatments of potential diacriticals to determine whether it is better to treat a given piece of ink as a diacritical or not, directly compare the two outcomes by score and keep a strict accounting of the ink.

BRIEF DESCRIPTION OF THE DRAWINGS

A preferred embodiment of the present invention is now described, by way of example only, with reference to the accompanying drawings in which:

FIG. 1 illustrates an example image of a word written in cursive style with diacriticals;

FIG. 2 illustrates the example image of the word in FIG. 1 divided into a sequence of feature vectors;

FIG. 3 illustrates a block diagram of a system architecture for an on-line recognizer according to the preferred embodiment of the present invention;

FIG. 4 illustrates a corresponding list of diacriticals for the example image of the word in FIG. 1 according to the preferred embodiment of the present invention;

FIG. 5 illustrates a mapping between the list of diacriticals and a bit field according to the preferred embodiment of the present invention;

FIG. 6 illustrates a typical structure of a theory according to the preferred embodiment of the present invention;

DETAILED DESCRIPTION OF THE PREFERRED EMBODIMENT

Figure 7:
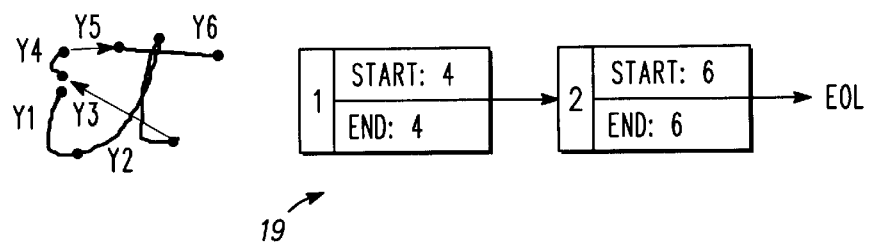
FIG. 7 illustrates a specific example according to the preferred embodiment of the present invention.

A method and apparatus is described herein which allows trying a number of different treatments of potential diacriticals to determine whether it is better to treat a given piece of ink as a diacritical or not, directly compare the two outcomes by score and keep a strict accounting of the ink. The use of a forward search (as described in J. J. Odell, V. Valtchev, P. C. Woodland, S. J. Young, "A one pass decoder design for large vocabulary recognition", Proc. Human Language Technology Workshop, Plainsboro, N.J., March, 1994 and incorporated herein by reference) provides the present invention with a natural mechanism for considering alternative treatments of diacriticals. and diacritical-containing characters. The preferred embodiment of the present invention generates theories that embody different diacritical treatments and scores them, allowing the normal competitive mechanisms of the forward search determine which theories survive to propagate.

Moreover, the preferred embodiment of the present invention accounts for the ink contained in hypothetical diacriticals. Specifically, the preferred embodiment of the present invention ensures that if a given piece of ink is used as a diacritical mark (e.g., as the dot of an "i"), the same given piece of ink is not used again later as either a diacritical mark or a separate character. The preferred embodiment of the present invention further ensures that if a piece of ink is not used as a diacritical, the piece of ink must be used as another character, or, conversely, the theory must be penalized for not using the ink.

Referring to FIG. 3, a block diagram of a system architecture for an on-line recognizer according to the preferred embodiment of the present invention is illustrated. The system 10 is comprised of three modules: a preprocessor module 12, a character recognizer module 20 and a search module 30. The preprocessor module 12 has an input 14 to receive ink, a first output 16 to output a sequence of feature vectors 17 and a second output 18 to output a list of diacriticals 19 (described in detail below).

The character recognizer module 20 is coupled to the pre-processor module 12. The character recognizer module 20 has a first input 22 to receive the sequence of feature vectors 17, a second input 24 to receive the list of diacriticals 19, a third input 26 to receive a character scoring query 37 (described in detail below) and an output 28 to output a recognition score 29 (described in detail below) in response to the character scoring query 37.

The search module 30 is coupled to the character recognizer module 20 and the pre-processor module 12. The search module 30 has a first input 32 to receive a length of the sequence of feature vectors 17, a second input 34 to receive the recognition score 29, a first output 36 to output the character scoring query 37 and a second output 38 to output ranked interpretation strings. Moreover, at least one of the following is coupled to the search module 30: a word and line segmentation logic module 40, a dictionary 42 and a language model 44.

The preferred embodiment of the present invention accounts efficiently and accurately for every potential diacritical in the ink. Accounting efficiently and accurately for every diacritical in the ink is first introduced by considering a single word that is completely written before recognition starts. The first step involves the pre-processor module 12 identifying likety diacritcal marks by scanning the ink. Good candidates for diacritical marks are shorty simple pieces of ink. As shown in FIG. 4, a list of these diacriticals 19 is built corresponding to the example image for the word "city" in FIGS. 1 and 2. Start stroke 13 and end stroke 13, where 13 represents feature vector $y_{13}$, corresponds to the dot of the "i" in the word "city" illustrated in FIG. 2. Start stroke 15 and end stroke 15, where 15 represents feature vector $y_{15}$, corresponds to the cross of the "t" in the word "city" illustrated in FIG. 2.

At recognition time; as the ink is traversed with the search, the diacritical-containing characters are processed by scoring them twice. One variant of the diacritical-containing character is scored Without adding a diacritical. The other variant of the diacritical-containing character is scored by. selecting a most appropriate diacritical mark from the list of diacriticals 19 and presenting the ink for the body of the character together with the ink for the diacritical to the character recognizer module 20 for scoring.

A "fuzzy" logic method is used to identify the most appropriate diacritical mark. For example, if the character recognizer module 20 is at looking for a t-cross, the character recognizer module 20 develops a score for each diacritical in the list 19 using a weighted sum of various measurements, including the distance of the midpoint of the diacritical from the midpoint of the character body, the extent to which the diacritical is above the center line of the writing, the extent to which the diacritical mark is a short, horizontal line that is wider than it is tall, and so on (as described in G. Seni, "External Word Segmentation of Off-line Handwritten Text Lines", Pattern Recognition, 27(1), January, 1994). The diacritical mark that scores the highest is the diacritical mark used to attach to a character hypothesis for scoring.

Once the character recognizer module 20 has scored the diacritical-containing character both ways (with and without a diacritical), the search module 30 takes whichever variant scored the highest and uses that as the score for a character theory. In a search based recognizer, a theory consists of a current character hypothesis, as well as a record of a character string preceding the current character hypothesis. Each theory thus encodes an interpretation of all of the ink processed up to a point by the search.

To account correctly for the use (or non-use) of a diacritical and to carry this information forward as theories survive to propagate to subsequent characters, a data structure (e.g., a 32-bit bit field) 50 having a plurality of data units is added to each theory as a means for recording the diacriticals that have been previously used at this point. FIG. 5 illustrates a mapping between the list of diacriticals 19 and the bit-field 50. Each bit in the bit field corresponds to an entry in the list of diacriticals 19. The contents of the bit field 50 are copied into each new theory as it is created by propagation, so that each theory knows which diacriticals have been previously used by the theories that preceded it.

FIG. 6 is a typical structure of the theory in a forward search extended to include diacritical-related fields. Start Diacriticals (StartDiacs) 60 is the bit-field inherited from the parent theory. Diacritical (Diac) 62 is the bit-field of diacriticals used by this theory's model. Exit used diacriticals (ExitUsedDiacs) 64 is a logic AND of StartDiacs 60 and Diac 62, which is to be passed to descendant theories. Dashed fields 66, Score 68 and Diac 62, are computed but not actually stored in the theory.

Continuing the example, if the best t-cross was located at entry number two in the list of diacriticals 19, the character recognizer module 20 would set the second bit in the bit field. Setting the second bit in the bit-field indicates that the ink corresponding to entry number two is used as a diacritical.

The above-described method of accounting provides extremely compact storage for previously used diacritical information, and it allows the system 10 to test very efficiently that a piece of ink is used exactly once. In the step where the character recognizer module 20 identifies the most appropriate diacritical for a given character, the character recognizer module 20 can refuse to consider any diacriticals that have been previously used simply by checking the appropriate bit in the bit-field attached to the theory (as stated previously, this is a binary AND operation, which is ordinarily a single clock cycle instruction). Similarly, the character recognizer module 20 can refuse to, score (or give a very bad score to) a character that uses ink that overlaps any previously used diacritical.

Moreover, the present invention further ensures that if a piece., of ink is not used as a diacritical, it must be used as another character or, conversely, the theory must be penalized for not using it. For example, when the character recognizer module 20 scores an end-of-word (EOW) theory, it can check that all subsequent ink has been used as a diacritical. This is often the case when diacriticals are written at the end of the word—the last character ends, but there is still some ink in the original writing order that should have been used in the course of processing the various t's, i's, x's and apostrophes in the body of the word. To the extent that all the ink has not previously been used, or worse, does not appear at all in the list of diacriticals 19, the character recognizer module 20 views the theory with suspicion and penalizes the theory.

At this point, an efficient and accurate accounting for every diacritical in the writing by considering a single word that is completely written before recognition starts has been described according to the preferred embodiment of the present invention. The following discussion now considers recognizing a larger piece of text according to the preferred embodiment of the present invention. It appears that eventually the number of diacriticals in the list of diacriticals 19 will exceed the size of the bit-field when recognizing a larger piece of text. As a result, it appears that the system 10 will be forced to increase the size of the theory structure if the system 10 is to account for the delayed diacriticals accurately and the above described efficiency will be lost. The above described method, however, will not require the system 10 to increase the size of the structure in order to account for the delayed diacriticals accurately because the above described method takes advantage of the time synchronous nature of the forward search.

Since there is a time synchronous nature of the forward search, once the search point has advanced beyond where the diacritical is actually written, the system 10 disregards the corresponding ink—that is, the ink must either have been used earlier as a diacritical, or more recently as part of a character. In either case, the ink is accounted for and the system 10 no longer needs to track the ink.

In order to take advantage of the time synchronous nature of the forward search and allow the system 10 to disregard ink in the list of diacriticals 19 that has already been accounted for, the list of diacriticals 19 is transformed into a ring, in which the oldest diacriticals are replaced once the search point has advanced beyond them. The easiest approach to implement the concept of transforming the list of diacriticals 19 into a ring is to find the first thirty-two diacriticals (or whatever number of bits in the bit field the system is utilizing) in writing order by scanning the ink, and then stopping the scan. As the search module 30 searches past the ink corresponding to ink representing diacriticals in the list of diacriticals 19, ink representing a diacritical is replaced by ink representing a next potential diacritical in writing order by restarting the scan where the scan previously left off.

Transforming the list of diacriticals 19 into a ring gives the present invention the ability to account efficiently and accurately for every potential diacritical in the writing, subject to two limitations.

The first limitation is that diacriticals must be written after the character in which they appear—otherwise the preprocessor module 12 cannot discard the diacriticals once the search point advances beyond them, as the diacriticals will be needed to complete a character in the future. In practice, this rules out writing in which a t-cross is written before the word, and then the word is written underneath the t-cross to link up and complete the character "t". This is a degenerate case, and research in handwriting recognition has not observed anybody who tries to write in this manner. It is important to note that the first limitation applies only to anticipatory diacriticals. It is perfectly acceptable to draw the t-cross first and then immediately draw the body of the "t". Drawing the t-cross immediately followed by the body of the "t" still preserves the normal left-to-right flow of the writing and the search automatically creates a character hypothesis containing all of the relevant ink.

The second limitation is equally minor as the first limitation. The writer must complete all of the characters in a word by writing the corresponding diacriticals before advancing too far in his writing. If the writer writes an entire sentence before dotting an "i" in the first word, the list of diacriticals 19 may fill up before the dot is encountered. Generally, people complete each word as it is written before going on to the next word. Thus, it is not an unreasonable restriction on a real system to require such a limitation.

Referring back to FIG. 3, a complete analysis of the operation of the system 10 is generally described. The pre-processor module 12 performs some low-level operations on the raw ink such as re-sampling, filtering, smoothing and size normalization (as described in W. Guerfali and R. Plamandon, "Normalizing and Restoring On-Line Handwriting", Pattern Recognition, 26(3);419–431, 1993). The pre-processor module 12 segments the cleaned and normalized ink into a sequence of feature vectors 17 (e.g., $Y=y_1, y_2, \ldots, y_T$) and identifies potential diacriticals 19 (e.g., $D=d_1, d_2, \ldots, d_{n_D}$). The sequence of feature vectors Y 17 and the list of diacriticals D 19 are made available to the character recognizer module 20. The length of the sequence of feature vectors 17 is passed on to the search module 30, which carries on T score-propagate steps.

At each time step, the observed input $y_t$ is compared against a set of open theories, and a probability of that theory generating the input is multiplied into the theory's ongoing score. At any time, a theory is a product of n probabilities, one for each time step. The theories are directly compared, and some subset may be selected for further evaluation. Each theory has the possibility of propagating to generate a set of new theories which encode possible completions of the utterance from the current point in time. By carefully controlling the rate of new theory propagation and the destruction of obsolete theories, the exponential growth of the search space is controlled.

Probabilities are generated by sending character scoring queries 37 from the search module 30 to the character recognizer module 20. These character scoring queries 37 specify the character associated with the theory in question, the time step when the theory was created, the current time step, and a bit-field with bits set indicating previously used diacriticals. The character recognizer module 20 responds with a recognition score 29 and updates the diacritical bit-field if an unused diacritical was claimed by the given character hypothesis. At the end of T time steps, the search module 30 outputs a ranked list of possible interpretation strings which represents the input ink.

Figure 8:
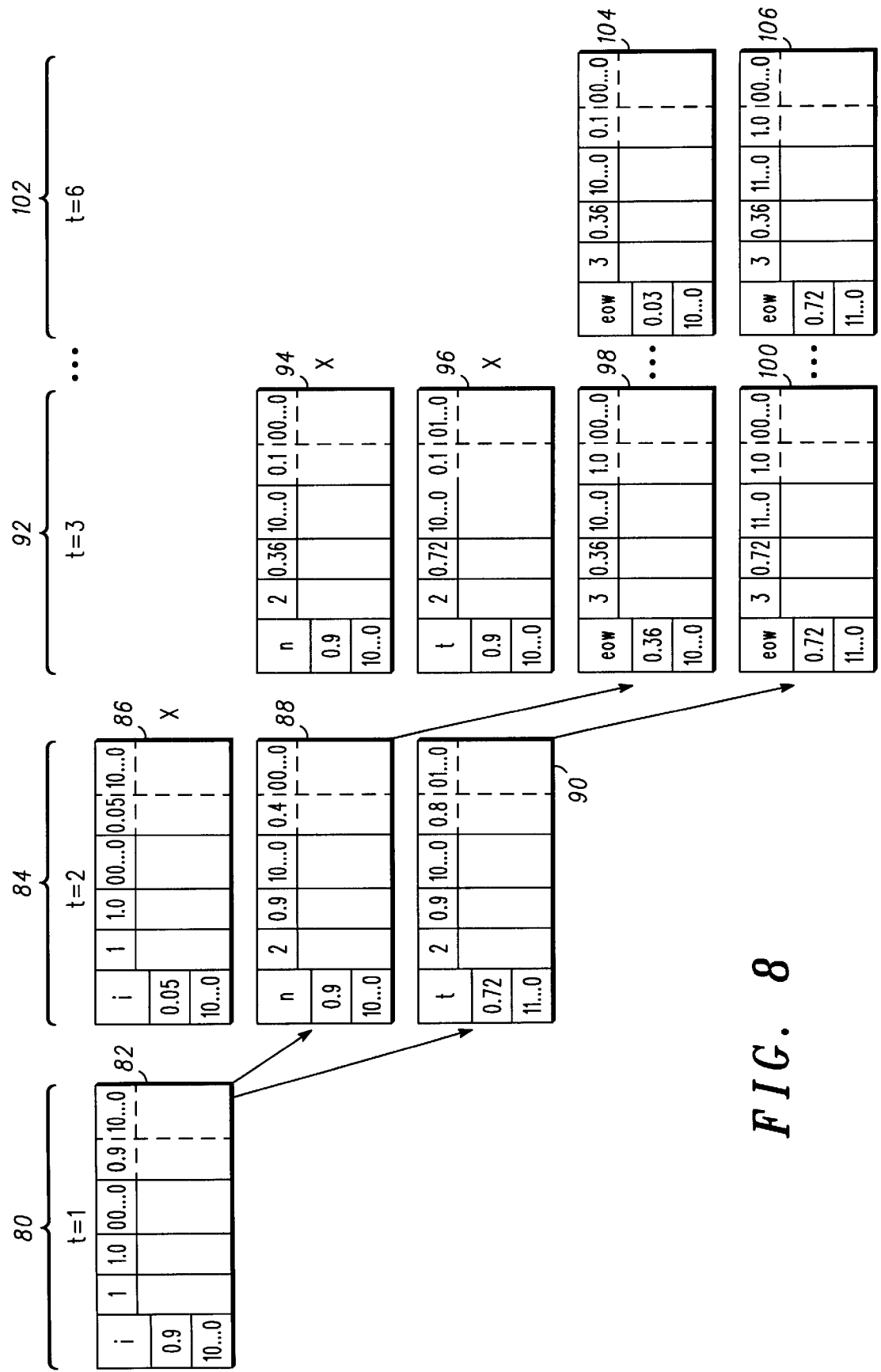
FIG. 8 illustrates a search tree for a dictionary for FIG. 7 according to the preferred embodiment of the present invention.

To elaborate further, FIGS. 7 and 8 illustrate a specific search example with diacriticals. In this example, input ink for the word "it" has been divided into six feature vectors and two potential diacriticals have been identified as shown in FIG. 7. The example further assumes a dictionary of two words only—namely, "in" and "it". Accordingly, the decoding process starts at time step one (t=1) 80 by creating a theory 82 for the character "i". A request to score this character hypothesis is sent to the character recognizer module 20 which returns a score of 0.9 and an indication of having used the first diacritical in the list of diacriticals 19.

This "i"-theory then propagates into two descendants theories, one for the character "n" and one for the character "t". Therefore, at time step two (t=2) 84 there are three active theories 86, 88 & 90. It is important to note that the newly created theories inherit from the "i"-theory its bit-field of used diacriticals as well as its score. At t=2, the "i"-theory 86 scores poorly and hence the "i"-theory is removed from further consideration.

On the other hand, the "n"-theory 88 and the "t"-theory 90 score reasonably well and thus propagate into EOW theories. At the end of t=2, the Diac bit-field in the "t"-theory 90 indicates that the character recognizer module 20 used the second potential diacritical from the list of diacriticals 19. This diacritical is correct, but also is the only diacritical available since the StartDiacs bit-field of the theory indicated that entry number one was previously used by a parent theory.

At time step three (t=3) 92, the "n"-theory 94 and the "t"-theory 96 score badly and thus are deactivated; the EOW theories 98 & 100 score well and continue active. At the last time step, time step six (t=6) 102, the EOW theory 104 corresponding to the word "in" scores poorly because it leaves ink unaccounted for in one of the two potential diacriticals. The EOW theory 106 corresponding to the word "it", however, scores well because the two diacriticals were previously used at previous time steps.

Figure 9:
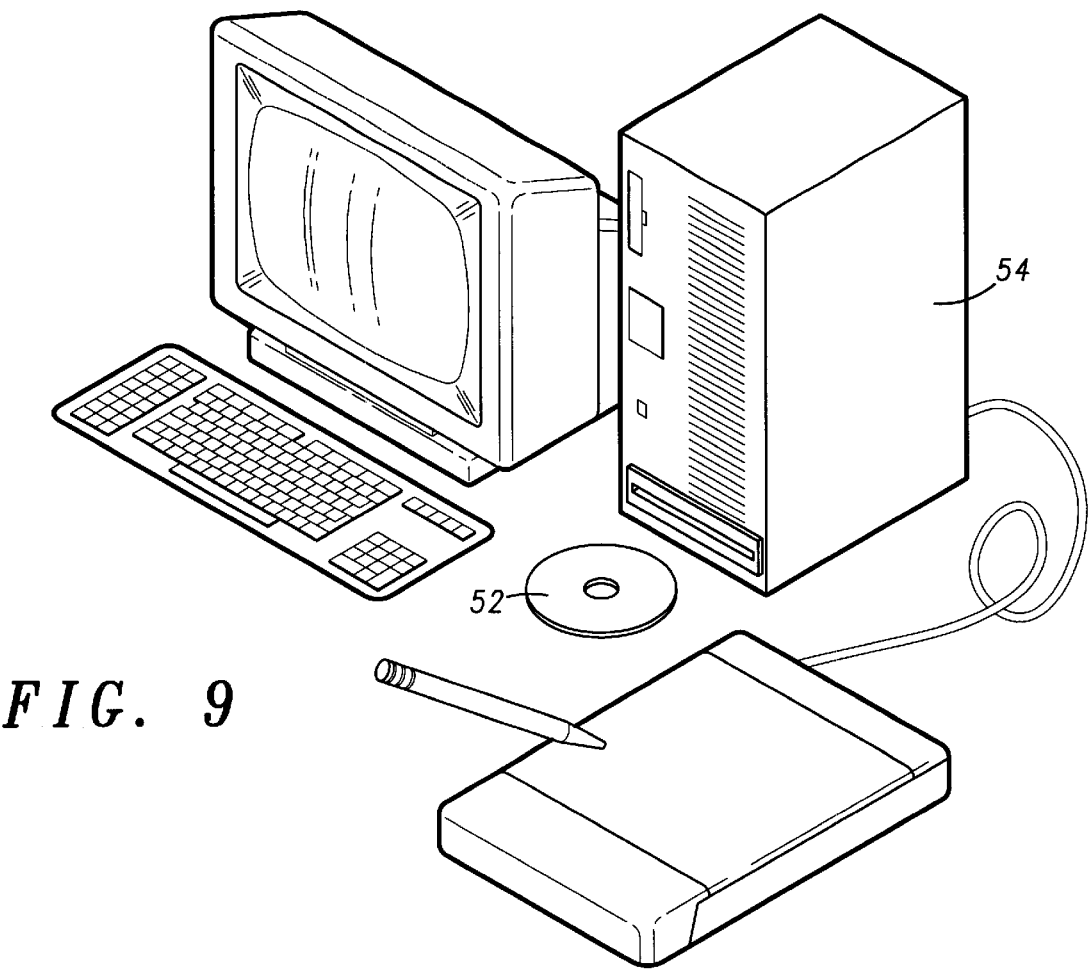
FIG. 9 illustrates a general block diagram according to the preferred embodiment of the present invention.

FIG. 9 illustrates a general block diagram according to the preferred embodiment of the present invention. The above-described system is preferably stored on a storage medium 52 having stored thereon a set of instructions, which when loaded into a microprocessor 54 causes the microprocessor 54 to scan an ink stream of handwritten input to identify potential diacriticals, build a list of diacriticals, traverse the ink stream, process a potential diacritical-containing character, score the diacritical-containing character with a selected diacritical from the list of diacriticals to generate a score, use the score for a theory, wherein the theory consists of a current character hypothesis and a record of a character string preceding the current character hypothesis, add a bit-field to the theory, wherein each bit in the bit-field corresponds to an entry in the list of diacriticals and, as a new theory is created by propagation, copy contents of the bit-field into the new theory, wherein a bit in the bit field of the theory is set corresponding to the selected diacritical.

Alternatively, the above-described system is stored on a storage medium 52 having stored thereon a set of instructions, which when loaded into a microprocessor 54 causes the microprocessor 54 to scan an ink stream of handwritten input to identify potential diacriticals, build a list of diacriticals, traverse the ink stream, process a potential diacritical-containing character, score the potential diacritical-containing character without adding a diacritical to generate a first score for a first variant of the potential diacritical-containing character, score the diacritical-containing character with at least one diacritical selected from the list of diacriticals to generate at least a second score for at least a second variant of the potential diacritical-containing character, compare the first score with the at least second score in order to make a decision as to which variant of the potential diacritical-containing character produced a highest score, use the highest score as a score for a theory, wherein the theory consists of a current character hypothesis and a record of a character string preceding the current character hypothesis, and record the decision.

While the invention has been described in conjunction with a specific embodiment thereof, additional advantages and modifications will readily occur to those skilled in the art. The invention, in its broader aspects, is therefore not limited to the specific details, representative apparatus and illustrative examples shown and described. Various alterations, modifications and variations will be apparent to those skilled in the art in light of the foregoing description. For example, multiple alternatives, with and without diacriticals, could be generated and propagated forward independently. Generating multiple alternatives eliminate pruning and every possible interpretation of the input is generated. Thus, it should be understood that the invention is not limited by the foregoing description, but embraces all such alterations, modifications and variations in accordance with the spirit and scope of the appended claims.

We claim:

1. A method of diacritical processing for unconstrained, on-line handwriting recognition using a forward search comprising:

scanning an ink stream of handwritten input to identify potential diacriticals;

building a list of diacriticals;

traversing the ink stream;

processing a potential diacritical-containing character;

scoring the potential diacritical-containing character without adding a diacritical to generate a first score for a first variant of the potential diacritical-containing character;

scoring the potential diacritical-containing character with a diacritical selected from the list of diacriticals to generate a second score for a second variant of the potential diacritical-containing character;

comparing the first score with the second score in order to make a decision as to which variant of the potential diacritical-containing character produced a highest score;

using the highest score as a score for a theory, wherein the theory consists of a current character hypothesis and a record of a character string preceding the current character hypothesis; and recording the decision.

2. The method according to claim 1 wherein the step of recording the decision comprises:

adding a data structure having a plurality of data units to the theory, wherein each data unit in the data structure corresponds to an entry in the list of diacriticals;

as the diacritical-containing character is scored highest using a selected diacritical from the list of diacriticals, setting a data unit in the data structure of the theory corresponding to the selected diacritical; and as a new theory is created by propagation, copying contents of the data structure into the new theory.

3. The method according to claim 2 wherein the data structure is a bit-field.

4. The method according to claim 2 further comprising determining if a next character hypothesis conflicts with a previously used diacritical.

5. The method according to claim 2 further comprising checking that all subsequent ink has been used as a diacritical when scoring an end-of-word theory.

6. A method of handwriting recognition using diacritical processing in a forward search comprising:

scanning an ink stream of handwritten input to identify a predetermined number of potential diacriticals in writing order;

terminating the step of scanning after identifying the predetermined number of potential diacriticals at time X;

building a list of diacriticals;

traversing the ink stream;

processing potential diacritical-containing characters; and as a potential diacritical is passed in the step of traversing, discarding the potential diacritical from the list of diacriticals and replacing the potential diacritical with a next potential diacritical in the ink stream in writing order beginning at time X.

7. A method of handwriting recognition using diacritical processing in a forward search comprising:

scanning an ink stream of handwritten input to identify potential diacriticals;

building a list of diacriticals;

traversing the ink stream;

processing a potential diacritical-containing character;

scoring the diacritical-containing character with a selected diacritical from the list of diacriticals to generate a score;

using the score for a theory to progressively build interpretation strings for the ink stream of handwritten input, wherein the theory consists of a current character hypothesis and a record of a character string preceding the current character hypothesis;

adding a data structure having a plurality of data units to the theory, wherein each data unit in the data structure corresponds to an entry in the list of diacriticals; and as a new theory is created by propagation, copying contents of the data structure into the new theory.

8. The method according to claim 7 further comprising setting a data unit in the data structure of the theory corresponding to the selected diacritical.

9. An apparatus used for handwriting recognition using diacritical processing in a forward search comprising:

a preprocessor module for scanning an ink stream of handwritten input to identify potential diacriticals and building a list of diacriticals;

a character recognizer module, coupled to the pre-processor module, for scoring a potential diacritical-containing character without adding a diacritical to generate a first score for a first variant of the potential diacritical-containing character and scoring the diacritical-containing character with a diacritical selected from the list of diacriticals to generate a second score for a second variant of the potential diacritical-containing character; and a search module, coupled to the pre-processor module and to the character recognizer module, for comparing the first score with the second score in order to make a decision as to which variant of the potential diacritical-containing character produced a highest score, using the highest score as a score for a theory, wherein the theory consists of a current character hypothesis and a record of a character string preceding the current character hypothesis and recording the decision.

10. The apparatus according to claim 9 further comprising at least one of the following coupled to the search module: a word and line segmentation logic module, a dictionary and a language model.

11. An apparatus used for handwriting recognition using diacritical processing in a forward search comprising:

a pre-processor module for scanning an ink stream of handwritten input, generating a list of diacriticals based on the scanned ink stream, traversing the ink stream, and generating a sequence of feature vectors based on the traversed ink stream;

a character recognizer module, coupled to the pre-processor module, for associating a recognition score with a received character scoring query; and a search module, coupled to the pre-processor module and to the character recognizer module, for generating character scoring queries and propagating a plurality of theories.

12. A storage medium having stored thereon a set of instructions, which when loaded into a microprocessor causes the microprocessor to scan an ink stream of handwritten input to identify potential diacriticals, build a list of diacriticals, traverse the ink stream, process a potential diacritical-containing character, score the diacritical-containing character with a selected diacritical from the list of diacriticals to generate a score, use the score for a theory, wherein the theory consists of a current character hypothesis and a record of a character string preceding the current character hypothesis, add a data structure having a plurality of data units to the theory, wherein each data unit in the data structure corresponds to an entry in the list of diacriticals and, as a new theory is created by propagation, copy contents of the data structure into the new theory.

13. The storage medium according to claim 12 wherein a data unit in the data structure of the theory is set corresponding to the selected diacritical.

14. A storage medium having stored thereon a set of instructions, which when loaded into a microprocessor causes the microprocessor to scan an ink stream of handwritten input to identify potential diacriticals, build a list of diacriticals, traverse the ink stream, process a potential diacritical-containing character, score the potential diacritical-containing character without adding a diacritical to generate a first score for a first variant of the potential diacritical-containing character, score the diacritical-containing character with a diacritical selected from the list of diacriticals to generate a second score for a second variant of the potential diacritical-containing character, compare the first score with the second score in order to make a decision as to which variant of the potential diacritical-containing character produced a highest score, use the highest score as a score for a theory, wherein the theory consists of a current character hypothesis and a record of a character string preceding the current character hypothesis, and record the decision.

* * * * *